US009849772B2

(12) United States Patent
Takami et al.

(10) Patent No.: US 9,849,772 B2
(45) Date of Patent: Dec. 26, 2017

(54) VEHICULAR DRIVE DEVICE

(71) Applicant: AISIN AW CO., LTD., Anjo-shi, Aichi-ken (JP)

(72) Inventors: Shigeki Takami, Anjo (JP); Takahisa Hirano, Anjo (JP)

(73) Assignee: AISIN AW CO., LTD., Anjo (JP)

( * ) Notice: Subject to any disclaimer, the term of this patent is extended or adjusted under 35 U.S.C. 154(b) by 110 days.

(21) Appl. No.: 15/027,911

(22) PCT Filed: Nov. 6, 2014

(86) PCT No.: PCT/JP2014/079443
§ 371 (c)(1),
(2) Date: Apr. 7, 2016

(87) PCT Pub. No.: WO2015/079880
PCT Pub. Date: Jun. 4, 2015

(65) Prior Publication Data
US 2016/0272058 A1 Sep. 22, 2016

(30) Foreign Application Priority Data

Nov. 27, 2013 (JP) .................................. 2013-245058

(51) Int. Cl.
*B60K 6/365* (2007.10)
*B60K 6/445* (2007.10)
(Continued)

(52) U.S. Cl.
CPC ................ *B60K 6/445* (2013.01); *B60K 6/36* (2013.01); *B60K 6/365* (2013.01); *B60K 6/40* (2013.01);
(Continued)

(58) Field of Classification Search
CPC ....................................................... B60K 6/365
See application file for complete search history.

(56) References Cited

U.S. PATENT DOCUMENTS 6,429,541 B2 * 8/2002 Takenaka ................. B60K 6/36
180/65.6
9,057,428 B2 * 6/2015 Motoyama ............... B60K 6/48
(Continued)

FOREIGN PATENT DOCUMENTS

EP 1 164 043 A2 12/2001
JP 2001-246953 A 9/2001
(Continued)

OTHER PUBLICATIONS

Nov. 10, 2016 Search Report issued in European Patent Application No. 14866569.8.
(Continued)

*Primary Examiner* — Tisha Lewis
(74) *Attorney, Agent, or Firm* — Oliff PLC

(57) ABSTRACT

A vehicular drive device where the damper, the differential gear device, and the first rotary electric machine are disposed side by side on a first axis that is common thereto, the second rotary electric machine is disposed on a second axis that is parallel to the first axis and is different from the first axis, the output device is disposed on a third axis that is parallel to the first axis and is different from the first axis and the second axis, and the first gear mechanism is disposed on a fourth axis that is positioned on a side opposite to the second axis side with respect to a first reference plane that is a plane including both the first axis and the third axis.

20 Claims, 8 Drawing Sheets

(51) Int. Cl.
*B60K 6/40* (2007.10)
*B60K 6/36* (2007.10)
*B60K 6/54* (2007.10)
*F16H 3/72* (2006.01)

(52) U.S. Cl.
CPC ............... *B60K 6/54* (2013.01); *F16H 3/727* (2013.01); *B60Y 2200/92* (2013.01); *B60Y 2400/73* (2013.01); *B60Y 2400/80* (2013.01); *Y02T 10/6239* (2013.01); *Y10S 903/911* (2013.01); *Y10S 903/917* (2013.01)

(56) References Cited

U.S. PATENT DOCUMENTS

| | | | |
|---|---|---|---|
| 9,309,933 B2* | 4/2016 | Date | B60K 6/387 |
| 2001/0011612 A1 | 8/2001 | Takenaka et al. | |
| 2001/0051556 A1 | 12/2001 | Takenaka | |
| 2002/0153727 A1 | 10/2002 | Takenaka et al. | |
| 2006/0183588 A1 | 8/2006 | Schmidt et al. | |
| 2008/0076616 A1 | 3/2008 | Kidokoro et al. | |
| 2009/0023529 A1 | 1/2009 | Sanji et al. | |
| 2010/0120569 A1 | 5/2010 | Sanji et al. | |
| 2010/0197436 A1 | 8/2010 | Ideshio et al. | |
| 2013/0008284 A1 | 1/2013 | Sada et al. | |
| 2013/0023369 A1 | 1/2013 | Sada et al. | |
| 2013/0023372 A1 | 1/2013 | Sada et al. | |
| 2013/0190122 A1 | 7/2013 | Schoenek et al. | |
| 2013/0324340 A1* | 12/2013 | Holmes | B60K 6/365 475/5 |

FOREIGN PATENT DOCUMENTS

| | | |
|---|---|---|
| JP | 2001-355727 A | 12/2001 |
| JP | 2007-008470 A | 1/2007 |
| JP | 2008-074267 A | 4/2008 |
| JP | 2009-001077 A | 1/2009 |
| JP | 2009-023427 A | 2/2009 |
| JP | 2011-183946 A | 9/2011 |
| JP | 2013-166548 A | 8/2013 |

OTHER PUBLICATIONS

Feb. 3, 2015 Search Report issued in International Patent Application No. PCT/JP2014/079443.

* cited by examiner

VEHICULAR DRIVE DEVICE

BACKGROUND

The present disclosure relates to a vehicular drive device that includes an input member drivingly coupled to an internal combustion engine through a damper, a first rotary electric machine, a second rotary electric machine, and a differential gear device, and an output device drivingly coupled to a wheel.

A device described in Japanese Patent Application Publication No. 2013-166548 is already known as an example of the vehicular drive device as mentioned above. In the device in Japanese Patent Application Publication No. 2013-166548, a rotational axis center [first axis A1] of the input member [input shaft I], the first rotary electric machine [MG1], and the differential gear device [power transfer PT], a rotational axis center [second axis A2] of the second rotary electric machine [MG2], and a rotational axis center [third axis A3] of the output device [output differential gear device DF] are disposed so as to be parallel to one another and positioned at vertices of a triangle as viewed in the axial direction. One gear [first gear 42] of a counter gear mechanism [C] disposed inside the triangle is commonly meshed with a gear [output gear 22] that rotates together with an output element [ring gear R] of the differential gear device and an output gear [37] of the second rotary electric machine. However, in the device in Japanese Patent Application Publication No. 2013-166548, a damper and the counter gear mechanism are disposed overlapping with each other as viewed in the axial direction and the counter gear mechanism and the second rotary electric machine are disposed overlapping with each other as viewed in the axial direction. Therefore, a length in the axial direction along the rotational axis center of the second rotary electric machine is likely to be long.

On the other hand, Japanese Patent Application Publication No. 2001-246953 discloses a device which has a same base configuration and in which a motive power transmission pathway from the differential gear device [P] side and a motive power transmission pathway from the second rotary electric machine [electric motor M] side with respect to the output device [differential device D] are separately configured. By separating the two motive power transmission pathways with respect to the output device, it is possible to set a total gear ratio without changing positions of the respective axes and also reduce restrictions in a vehicle mounted state. However, when considering an existence of a damper that is generally provided although there is no description about a damper in Japanese Patent Application Publication No. 2001-246953, it is difficult to dispose at least the members that overlap with the damper as viewed in the axial direction close to the internal combustion engine side. Thus, the length in the axial direction along the rotational axis center of the second rotary electric machine becomes long in the same manner as the device in Japanese Patent Application Publication No. 2013-166548.

SUMMARY

Therefore, it is desired, in a vehicular drive device with a multiaxial configuration that is coupled to a damper, to shorten the length in the axial direction along the rotational axis center of the second rotary electric machine.

The vehicular drive device according to an exemplary aspect of the present disclosure is a vehicular drive device that includes an input member drivingly coupled to an internal combustion engine through a damper, a first rotary electric machine, a second rotary electric machine, a differential gear device including three rotational elements, an output device drivingly coupled to a wheel, and in which, among the three rotational elements of the differential gear device, one rotational element is drivingly coupled to the input member, another rotational element is drivingly coupled to the first rotary electric machine, an output element as a resting rotational element is drivingly coupled to the output device, and the second rotary electric machine is drivingly coupled to the output device, a first gear mechanism that transmits a driving force between the output element and the output device, and a second gear mechanism that transmits a driving force between the second rotary electric machine and the output device, wherein the damper, the differential gear device, and the first rotary electric machine are disposed side by side on a first axis that is common thereto, the second rotary electric machine is disposed on a second axis that is parallel to the first axis and is different from the first axis, the output device is disposed on a third axis that is parallel to the first axis and is different from the first axis and the second axis, the first gear mechanism is disposed on a fourth axis that is positioned on a side opposite to the second axis side with respect to a first reference plane that is a plane including both the first axis and the third axis, and the second gear mechanism is disposed on a fifth axis that is positioned on a side opposite to the first axis side with respect to the a second reference plane that is a plane including both the second axis and the third axis.

In the present application, the term "drivingly coupled" means a state in which two rotational elements are coupled so as to be capable of transmitting a driving force (synonymous with torque) therebetween. This concept includes a state in which two rotational elements are coupled so as to rotate together and a state in which the two rotational elements are coupled so as to be capable of transmitting a driving force therebetween through one or more transmission members. Such transmission members include various members (e.g., a shaft, a gear mechanism, and a belt) for transmitting rotation at the same speed or a changed speed, and may include engagement devices (e.g., a friction engagement device and a mesh engagement device) for selectively transmitting the rotation and the driving force. The term "drivingly coupled" utilized with respect to each rotational element of the differential gear device refers to a drivingly coupled state without going through another rotational element of the differential gear device.

In addition, the term "rotary electric machine" is used as a concept including all of a motor (electric motor), a generator (electric generator), and a motor generator that functions as both a motor and a generator.

According to such a configuration, the first gear mechanism that transmits a driving force between the output element and the output device and the second gear mechanism that transmits a driving force between the second rotary electric machine and the output device are individually provided. Therefore, restrictions in arrangements of the respective parts can be reduced. In addition, by disposing the second gear mechanism on the fifth axis that is positioned on the side opposite to the first axis side with respect to the second reference plane including both the second axis and the third axis, the second gear mechanism can be disposed distant from the damper as viewed in the axial direction. In addition, by disposing the first gear mechanism on the fourth axis that is positioned on the side opposite to the second axis side with respect to the first reference plane including both the first axis and the third axis, the second gear mechanism can be disposed also distant from the first gear mechanism as viewed in the axial direction. Thereby, the second gear mechanism and the second rotary electric machine can be disposed close to the damper side in the axial direction. Thus, the length in the axial direction along the rotational axis center of the second rotary electric machine can be shortened.

Preferable aspects of the vehicular drive device according to the present disclosure will be described below. Note that the scope of the present disclosure is not limited to the preferable aspects described below.

In one aspect, preferably, the second gear mechanism is disposed so as not to overlap with the damper as viewed in an axial direction.

In the present application, with respect to the arrangement of two members, the phrase "overlapping as viewed in a certain direction" means that when a virtual line parallel to a viewing direction is moved in each direction orthogonal to the virtual line, a region where the virtual line intersects both of the two members exists in at least one part. Consequently, with respect to the arrangement of two members, the phrase "not overlapping as viewed in a certain direction" means that when a virtual line parallel to a viewing direction is moved in each direction orthogonal to the virtual line, a region where the virtual line intersects both of the two members does not exist.

According to such a configuration, the interference between the second gear mechanism and the damper can be avoided regardless of the positional relationship in the axial direction between the second gear mechanism and the damper. Thus, the second gear mechanism is disposed close to the damper side in the axial direction as well as the internal combustion engine side. As a result, the second rotary electric machine can be disposed close to the internal combustion engine side. Thereby, the length of in the axial direction along the rotational axis center of the second rotary electric machine can be effectively shortened.

In one aspect, preferably, the second gear mechanism includes a first gear that is meshed with a first output gear of the second rotary electric machine and a second gear that is meshed with an input gear of the output device at a position different from the first gear in an axial direction, and the first gear is disposed on a side opposite to the second rotary electric machine side in the axial direction with respect to the second gear.

According to such a configuration, the entire second gear mechanism is disposed on the side opposite to the second rotary electric machine side with respect to the input gear of the output device. Thus, the second gear mechanism can be disposed close to the damper side as well as the internal combustion engine side in the axial direction. As a result, the second rotary electric machine can be disposed close to the internal combustion engine side. Therefore, the length in the axial direction along the rotational axis center of the second rotary electric machine can be effectively shortened.

In one aspect, preferably, the first gear is disposed so as not to overlap with the damper as viewed in the axial direction and so as to overlap with the damper as viewed in a radial direction.

According to such a configuration, compared to a configuration in which the first gear overlaps with the damper as viewed in the axial direction, the length in the axial direction along the rotational axis center of the second rotary electric machine can be effectively shortened.

In one aspect, preferably, the first gear mechanism includes a third gear that is meshed with a second output gear rotating together with the output element and a fourth gear that is meshed with an input gear of the output device at a position different from the third gear in an axial direction, and the fourth gear is disposed on the damper side in the axial direction with respect the third gear.

According to such a configuration, the input gear of the output device is disposed close to the damper side in the axial direction, therefore, the fourth gear mechanism can be disposed close to the damper side. As a result, the second rotary electric machine can be disposed close to the damper side. Therefore, the length in the axial direction along the rotational axis center of the second rotary electric machine can be effectively shortened.

In one aspect, preferably, in a vehicle mounted state, the second axis and the third axis are disposed on one side in a horizontal direction with respect to the first axis, and the second axis is disposed on an upper side with respect to the third axis.

According to such a configuration, a layout suitable to a vehicular drive device with a multiaxial configuration can be realized, and the length in the axial direction along the rotational axis center of the second rotary electric machine can be shortened.

DETAILED DESCRIPTION OF EMBODIMENTS

First Embodiment

A first embodiment of a vehicular drive device is explained with reference to drawings. A vehicular drive device 1 according to the present embodiment is a drive device for a hybrid vehicle provided with both an internal combustion engine E and rotary electric machines MG1, MG2 as driving sources of a wheel W. The vehicular drive device 1 is configured as a drive device for a so-called two-motor split type hybrid vehicle. In addition, the vehicular drive device 1 according to the present embodiment is configured as a drive device for a FF (Front Engine Front Drive) vehicle.

In the following explanation, terms relating to a direction, a position, etc. of respective members are used as a concept that includes a condition with difference due to an error that is acceptable in operation. In addition, the directions of the respective members indicate directions in a state where the members are mounted in the vehicular drive device 1.

Figure 1:
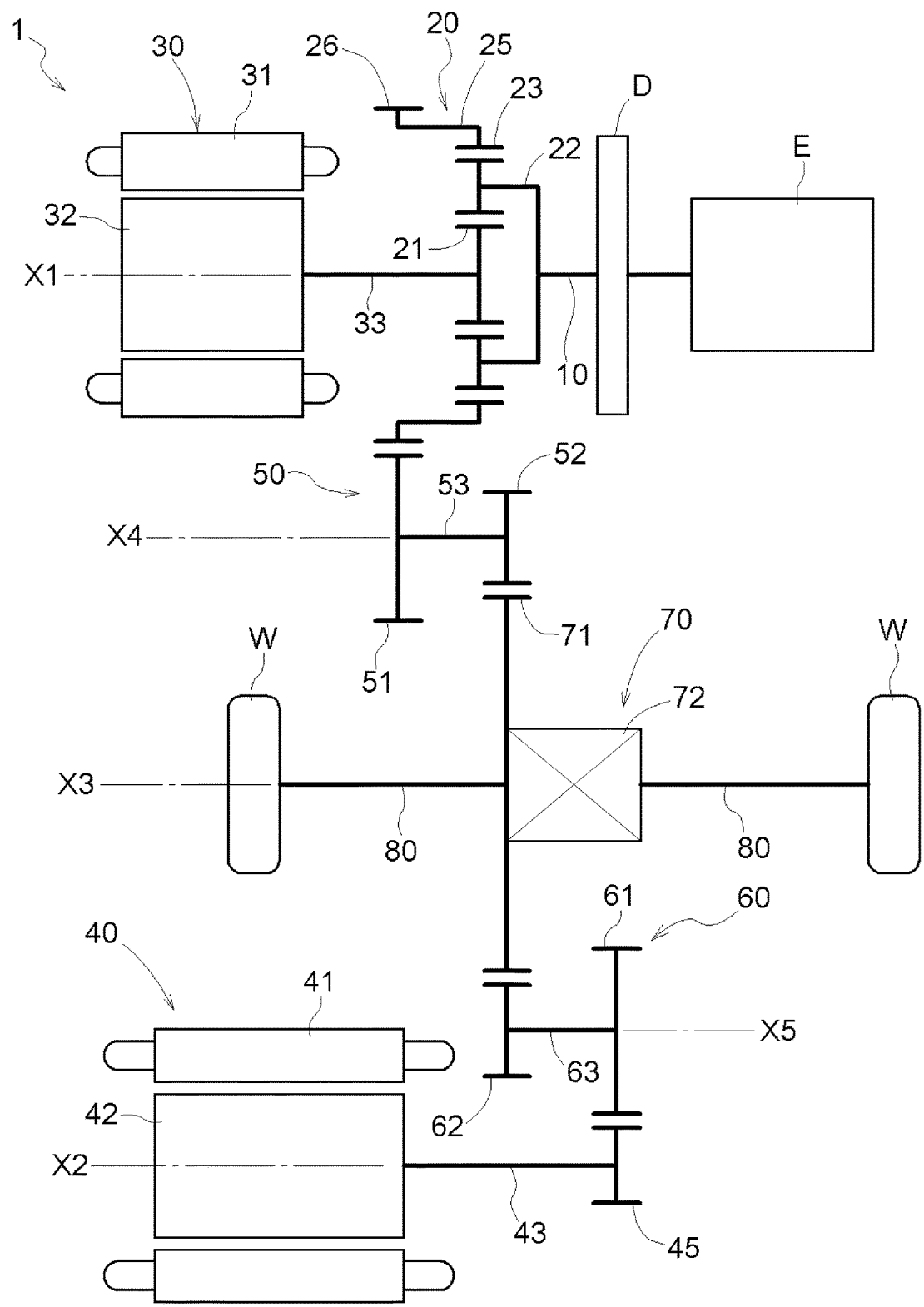
FIG. 1 is a skeleton view of a vehicular drive device according to a first embodiment.
Figure 3:
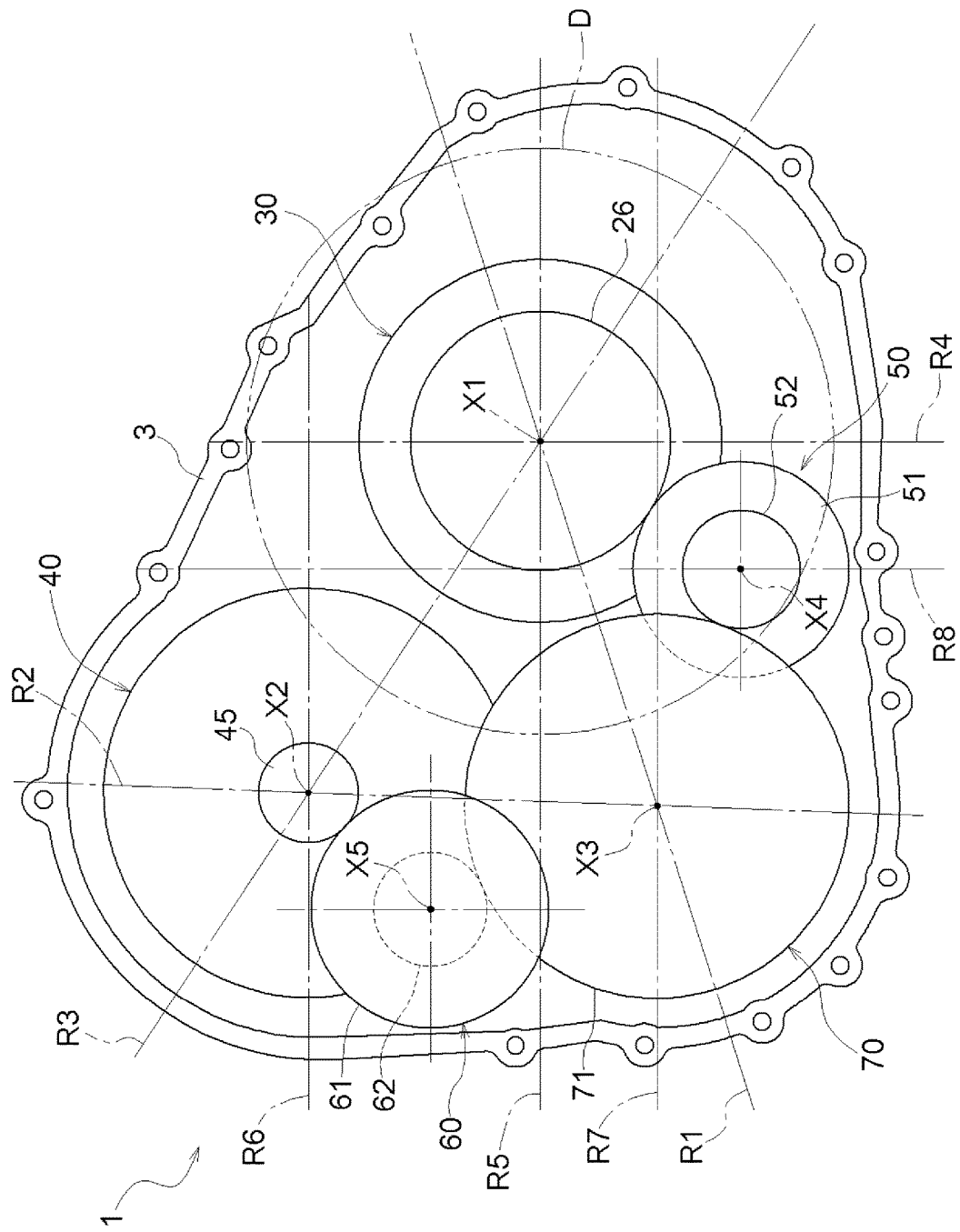
FIG. 3 is a schematic view showing an arrangement of parts as viewed in an axial direction.

As shown in FIG. 1, the vehicular drive device 1 is provided with an input shaft 10 drivingly coupled to the internal combustion engine E, a differential gear device 20, a first rotary electric machine 30, a second rotary electric machine 40, and an output device 70 drivingly coupled to the wheel W. In addition, the vehicular drive device 1 is provided with a first gear mechanism 50 that transmits a driving force between the differential gear device 20 and the output device 70 and a second gear mechanism 60 that transmits a driving force between the second rotary electric machine 40 and the output device 70 individually. As shown in FIG. 3, these are housed in a case (drive device case) 3.

Figure 4:
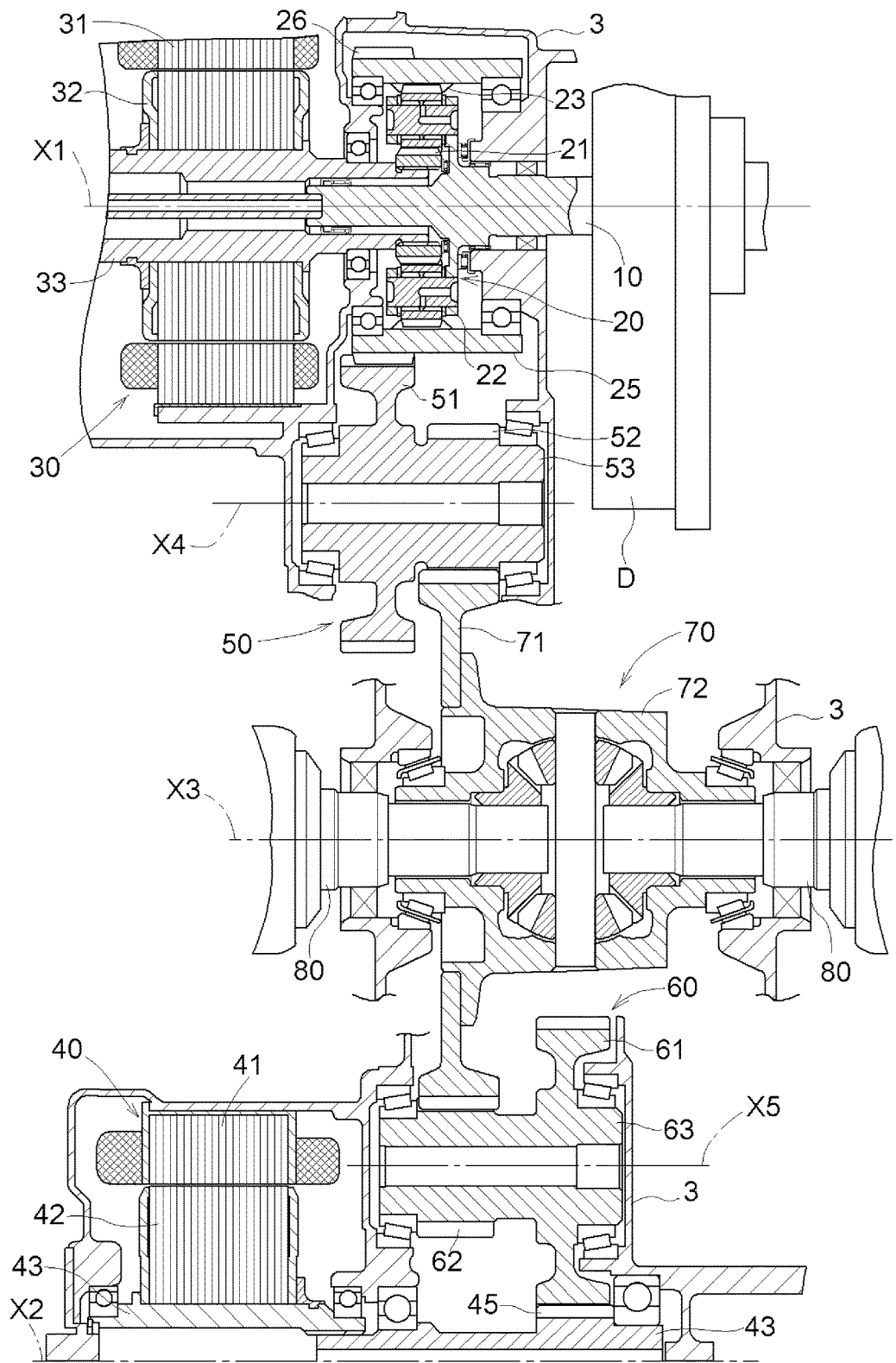
FIG. 4 is a partial sectional view of the vehicular drive device.

As shown in FIGS. 1 and 4, the input shaft 10, the differential gear device 20, and the first rotary electric machine 30 are disposed on a first axis X1 that is common thereto. The input shaft 10, the differential gear device 20, and the first rotary electric machine 30 are disposed side by side on the first axis X1 in this order from the internal combustion engine E side. The second rotary electric machine 40 is disposed on a second axis X2 that is different from the first axis X1. The output device 70 is disposed on a third axis X3 that is different from the first axis X1 and the second axis X2. The first axis X1, the second axis X2, and the third axis X3 are disposed so as to be parallel to one another. In the present embodiment, a direction that is parallel to the respective axes X1 to X3 is defined as "axial direction."

As shown in FIG. 3, the first axis X1, the second axis X2, and the third axis X3 are disposed so as to be positioned at vertices of a triangle as viewed in the axial direction. In the present embodiment, as viewed in the axial direction in a vehicle mounted state, the second axis X2 and the third axis X3 are disposed on one side in a horizontal direction with respect to the first axis X1. The second axis X2 and the third axis X3 are disposed at a nearly equal position in the horizontal direction as viewed in the axial direction. In addition, the second axis X2 is disposed on an upper side with respect to the third axis X3. In the present embodiment, the third axis X3 is disposed on a lower side with respect to the first axis X1 and the second axis X2 is disposed on the upper side with respect to the first axis X1.

The input shaft 10 is drivingly coupled to the internal combustion engine E. The internal combustion engine E is a motor (e.g., a gasoline engine or a diesel engine) that outputs mechanical power by being driven by combustion of fuel in the engine. In the present embodiment, the input shaft 10 is drivingly coupled to an output shaft (an internal combustion engine output shaft such as a crank shaft) of the internal combustion engine E. In addition, the input shaft 10 is drivingly coupled to the internal combustion engine E through a damper D that is disposed on the same axis (on the first axis X1) as the input shaft 10. It is preferable that the input shaft 10 is drivingly coupled to the internal combustion engine E through a clutch, etc. in addition to the damper D. In the present embodiment, the input shaft 10 corresponds to "input member."

The input shaft 10 is drivingly coupled to the differential gear device 20. The differential gear device 20 is configured by a planetary gear mechanism having three rotational elements of a sun gear 21, a carrier 22, and a ring gear 23. The differential gear device 20 includes the carrier 22 that supports a plurality of pinion gears, and the sun gear 21 and the ring gear 23 that are both meshed with the pinion gears. In the present embodiment, the differential gear device 20 is configured by a single pinion planetary gear mechanism. In addition, the three rotational elements of the differential gear device 20 correspond to the sun gear 21, the carrier 22, and the ring gear 23 in an order of rotational speed.

The "order of rotational speed" means an order of rotational speed in a rotating state of the respective rotational elements 21 to 23. The rotational speeds of the respective rotational elements 21 to 23 change depending on the rotating state of the differential gear device 20. However, the order (high-low) of the rotational speeds of the respective rotational elements 21 to 23 is constant because the order is determined by the structure of the differential gear device 20. Note that the order of the rotational speeds of the respective rotational elements 21 to 23 is equivalent to an order of allocation of the respective rotational elements 21 to 23 in a velocity diagram (also, referred to as a collinear chart: refer to FIG. 2).

In the present embodiment, the first rotary electric machine 30 is drivingly coupled to the sun gear 21, the input shaft 10 is drivingly coupled to the carrier 22, and the output device 70 is drivingly coupled to the ring gear 23. The first rotary electric machine 30 is drivingly coupled to the sun gear 21 without going through the carrier 22 or the ring gear 23, the input shaft 10 is drivingly coupled to the carrier 22 without going through the sun gear 21 or the ring gear 23, and the output device 70 is drivingly coupled to the ring gear 23 without going through the sun gear 21 or the carrier 22. In the present embodiment, the ring gear 23 corresponds to "output member."

Figure 2:
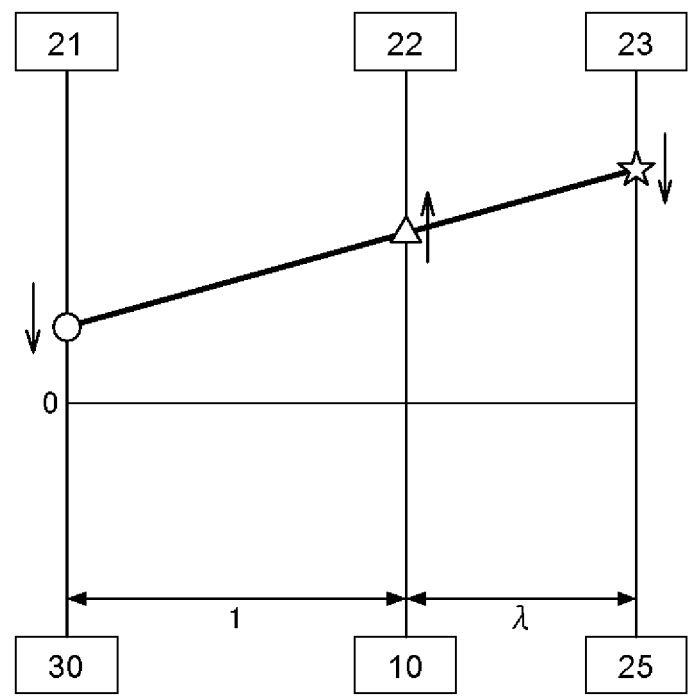
FIG. 2 is a velocity diagram of a differential gear device.

FIG. 2 is a velocity diagram showing an operation state of the differential gear device 20. In the velocity diagram, a vertical axis corresponds to the rotational speeds of the respective rotational elements. "0" indicates that the rotational speed is zero, the upper side represents positive rotational speed, and the lower side represents negative rotational speed. A plurality of vertical lines placed in parallel corresponds to the rotational elements 21 to 23 of the differential gear device 20, respectively. In addition, intervals of the vertical lines corresponding to the respective rotational elements 21 to 23 correspond to gear ratios λ (a ratio of the number of teeth of the sun gear 21 to the number of teeth of the ring gear 23=[the number of teeth of the sun gear 21]/[the number of teeth of the ring gear 23]) of the differential gear device 20. In addition, the straight line shown by thick line indicates an operation state of the differential gear device 20.

The differential gear device 20 distributes torque of the internal combustion engine E that is transmitted to the input shaft 10 to the first rotary electric machine 30 and the ring gear 23. That is, in the differential gear device 20, the carrier 22 that is medium in the order of rotational speed is drivingly coupled to the input shaft 10 so as to rotate together, and the torque of the input shaft 10 (internal combustion engine E) transmitted to the carrier 22 is distributed to the sun gear 21 that is at one end and the ring gear 23 that is at the other end in the order of rotational speed. The torque damped with respect to the torque of the internal combustion engine E is transmitted to the sun gear 21 as torque for generating electric power. The first rotary electric machine 30 mainly outputs reactive torque (regenerated torque) with respect to the torque distributed to the sun gear 21 to generate electric power. The torque damped with respect to the torque of the internal combustion engine E is transmitted to the ring gear 23 as torque for driving the wheel W. In the present embodiment, the differential gear device 20 functions as a power transfer (differential gear device for power transfer).

As shown in FIGS. 1 and 4, in the present embodiment, the ring gear 23 is integrally provided on an inner peripheral surface of a cylindrical differential output member 25 and a first output gear 26 is further integrally provided on an outer peripheral surface of the differential output member 25. In the present embodiment, the first output gear 26 is provided on an end portion of the differential output member 25 on the first rotary electric machine 30 side (on the side opposite to the internal combustion engine E side). In such manner, the ring gear 23 and the first output gear 26 are configured so as to rotate together. The first output gear 26 is meshed with a first gear 51 of the first gear mechanism 50. The ring gear 23 and the first output gear 26 that rotates together with the ring gear 23 are drivingly coupled to the output device 70 through the first gear mechanism 50.

The first rotary electric machine 30 includes a first stator 31 that is fixed to the case 3, and a first rotor 32 that is rotatably supported on a radially inner side of the first stator 31. The first rotor 32 is coupled to a first rotor shaft 33 so as to rotate together. The sun gear 21 is provided on the end portion of the first rotor shaft 33 on the internal combustion engine E side. In such a manner, the first rotor 32 is drivingly coupled to the sun gear 21 of the differential gear device 20 through the first rotor shaft 33.

The first rotary electric machine 30 is able to function as a motor (electric motor) that receives a supply of electric power and generates power, as well as function as a generator (electric generator) that receives a supply of power and generates electric power. The first rotary electric machine 30 is electrically connected to an electric storage device (battery, capacitor, etc., not shown). The first rotary electric machine 30, as described above, mainly functions as a generator that generates electric power using torque of the input shaft 10 (internal combustion engine E) that is inputted through the differential gear device 20. Note that the first rotary electric machine 30 may function as a motor when a vehicle travels on a highway, when the internal combustion engine E is started, etc.

The second rotary electric machine 40 includes a second stator 41 that is fixed to the case 3, and a second rotor 42 that is rotatably supported on a radially inner side of the second stator 41. The second rotor 42 is coupled to a second rotor shaft 43 so as to rotate together. A second output gear 45 is provided on the end portion of the second rotor shaft 43 on the internal combustion engine E side. In such a manner, the second rotor 42 is drivingly coupled to the second output gear 45 through the second rotor shaft 43. The second output gear 45 is meshed with a third gear 61 of the second gear mechanism 60. The second output gear 45 is drivingly coupled to the output device 70 through the second gear mechanism 60.

The second rotary electric machine 40 is able to function as a motor as well as function as a generator. The second rotary electric machine 40 is electrically connected to an electric storage device (not shown). The second rotary electric machine 40 mainly functions as a motor (assist motor) that assist a driving force for causing a vehicle to travel. Note that the second rotary electric machine 40 may function as a generator when the vehicle decelerates, etc.

The first gear mechanism 50 transmits a driving force between the ring gear 23 that is an output member of the differential gear device 20 and the output device 70. The first gear mechanism 50 includes the first gear 51, a second gear 52 that is provided at a position different from the first gear 51 in the axial direction, and a first connecting shaft 53 that connects the two gears 51, 52. The first gear mechanism 50 is disposed on a fourth axis X4 that is parallel to the first axis X1 and is different from the first axis X1, the second axis X2, and the third axis X3. The first gear 51 is meshed with the first output gear 26 that rotates together with the ring gear 23. The second gear 52 is meshed with an input gear 71 of the output device 70.

In the present embodiment, the second gear 52 is disposed on the internal combustion engine E side (damper D side) in the axial direction with respect to the first gear 51. In addition, the diameter of the second gear 52 is formed smaller (the number of teeth to be smaller) than the diameter of the first gear 51. The first gear mechanism 50 functions as a first deceleration mechanism (first counter deceleration mechanism) that decelerates the output rotation from the differential gear device 20 (amplifies the output torque from the differential gear device 20 at the same time) and transmits the decelerated rotation to the output device 70.

The second gear mechanism 60 transmits a driving force between the second rotary electric machine 40 and the output device 70. The second gear mechanism 60 includes the third gear 61, a fourth gear 62 that is provided at a position different from the third gear 61 in the axial direction, and a second connecting shaft 63 that connects the two gears 61, 62. The second gear mechanism 60 is disposed on a fifth axis X5 that is parallel to the first axis X1 and is different from the first axis X1, the second axis X2, the third axis X3, and the fourth axis X4. The third gear 61 is meshed with the second output gear 45 of the second rotary electric machine 40. The fourth gear 62 is meshed with the input gear 71 of the output device 70.

In the present embodiment, the third gear 61 is disposed on the side opposite to the second rotary electric machine 40 side in the axial direction with respect to the fourth gear 62. In the present embodiment, the third gear 61 is disposed on the internal combustion engine E side (damper D side) in the axial direction with respect to the fourth gear 62. In addition, the diameter of the fourth gear 62 is formed smaller (the number of teeth to be smaller) than the diameter of the third gear 61. The second gear mechanism 60 functions as a second deceleration mechanism (second counter deceleration mechanism) that decelerates the output rotation from the second rotary electric machine 40 (amplifies the output torque from the second rotary electric machine 40 at the same time) and transmits the decelerated rotation to the output device 70.

A motive power transmission pathway from the differential gear device 20 side and a motive power transmission pathway from the second rotary electric machine 40 side that are individually provided merge at the output device 70. The output device 70 includes the input gear 71 and a main body 72 coupled to the input gear 71. In the present embodiment, the main body 72 is disposed on the internal combustion engine E side (damper side) in the axial direction with respect to the input gear 71. The input gear 71 of the output device 70 is meshed with both the second gear 52 of the first gear mechanism 50 and the fourth gear 62 of the second gear mechanism 60. The input gear 71 is meshed with the second gear 52 and the fourth gear 62 at positions different from each other in a circumferential direction with reference to the third axis X3 (refer to FIG. 3).

The main body 72 includes a plurality of bevel gears that are meshed with each other and a housing case that houses the plurality of bevel gears, and constitute a differential gear mechanism. The output device 70 distributes and transmits rotation and torque inputted from the differential gear device 20 side and the second rotary electric machine 40 side to the input gear 71 through the two gear mechanisms 50, 60 that are independent of each other to the two, left and right, output shafts 80 (i.e., two, left and right, wheels W) at the main body 72. The output device 70 functions as an output device (output differential gear device) having the differential gear mechanism.

Thereby, it is possible to cause the vehicle to travel by a part of the torque of the internal combustion engine E and (if necessary) the torque of the second rotary electric machine 40 while controlling the internal combustion engine E so as to follow a most appropriate fuel consumption characteristic (in a state with high efficiency and less exhaust) and causing the first rotary electric machine 30 to generate electric power.

When considering the in-vehicle mountability of the vehicular drive device 1, the entire device is preferably downsized as much as possible. The vehicular drive device 1 for a FF vehicle that is disposed adjacent to the internal combustion engine E in a width direction of the vehicle is preferably downsized especially in the axial direction. Such a demand is firstly applied to the parts on the first axis X1, on which a plurality of constituent parts (the differential gear device 20, the first rotary electric machine 30, and the damper D) are disposed side by side.

In this aspect, in the present embodiment, as shown in FIG. 4, the entire differential gear device 20 is disposed overlapping with the differential output member 25 as viewed in a radial direction with reference to the first axis X1 in the inner side of the cylindrical differential output member 25. Therefore, the entire differential gear device 20 can be disposed inside a space in the axial direction occupied by the differential output member 25. In addition, because the first output gear 26 is integrally provided in an outer peripheral surface of the differential output member 25, the first output gear 26 can be also disposed in the space in the axial direction occupied by the differential output member 25. Thus, it is possible to shorten the length in the axial direction of the space occupied by the differential output member 25, the differential gear device 20, and the first output gear 26 by accommodating both the differential gear device 20 and the first output gear 26 inside the space occupied by the differential output member 25.

It is required to shorten the length in the axial direction also for the part (second rotary electric machine 40) on the second axis X2 in addition to the parts on the first axis X1 as described above. When the length in the axial direction along the second axis X2 can be shortened, the in-vehicle mountability can be further improved. Also, it is possible to utilize a large rotary electric machine as the second rotary electric machine 40 that mainly functions as an assist motor, without enlarging the length in the axial direction along the second axis X2. Alternatively, both of them can be realized in a preferable balance in accordance with required specification. In view of such a matter, in the present embodiment, the motive power transmission pathway between the differential gear device 20 and the output device 70 and the motive power transmission pathway between the second rotary electric machine 40 and the output device 70 are individually provided and the arrangement of the respective motive power transmission pathways is optimized.

Here, as shown in FIG. 3, in the present embodiment, a virtual plane including both the first axis X1 and the third axis X3 is defined as a first reference plane R1. In addition, a virtual plane including both the second axis X2 and the third axis X3 is defined as a second reference plane R2. In addition, a virtual plane including both the first axis X1 and the second axis X2 is defined as a third reference plane R3. A virtual perpendicular plane including the first axis X1 is defined as a fourth reference plane R4. In addition, a virtual horizontal plane including the first axis X1 is defined as a fifth reference plane R5. In addition, a virtual horizontal plane including the second axis X2 is defined as a sixth reference plane R6. In addition, a virtual horizontal plane including the third axis X3 is defined as a seventh reference plane R7.

In the present embodiment, the fourth axis X4 that is the rotational axis center of the first gear mechanism 50 that transmits a driving force between the differential gear device 20 and the output device 70 is disposed so as to be positioned on the third axis X3 side with respect to the third reference plane R3. The fifth axis X5 that is the rotational axis center of the second gear mechanism 60 that transmits a driving force between the second rotary electric machine 40 and the output device 70 is also disposed so as to be positioned on the third axis X3 side with respect to the third reference plane R3. Both the first gear mechanism 50 and the second gear mechanism 60 are disposed so as to be positioned, as a whole, on the third axis X3 side with respect to the third reference plane R3. In addition, both the first gear mechanism 50 and the second gear mechanism 60 are disposed so as to be positioned in a major portion on an outer side of a triangle pole-shaped space surrounded by the three reference planes R1 to R3.

In the present embodiment, the fourth axis X4 that is the rotational axis center of the first gear mechanism 50 is disposed so as to be positioned on the side opposite to the second axis X2 side with respect to the first reference plane R1. The first gear mechanism 50 is disposed so as to be positioned as a whole on the side opposite to the second axis X2 side with respect to the first reference plane R1. In addition, the fourth axis X4 is disposed so as to be positioned on the side opposite (lower side) to the second axis X2 side with respect to the seventh reference plane R7. Both the second gear 52 and the first connecting shaft 53 constituting the first gear mechanism 50 are disposed so as to be positioned as a whole on the side opposite (lower side) to the second axis X2 side with respect to the seventh reference plane R7. The first gear 51 constituting the first gear mechanism 50 is disposed so as to be positioned partially on the second axis X2 side (upper side) with respect to the seventh reference plane R7.

In addition, the fourth axis X4 is disposed so as to be positioned on the first axis X1 side with respect to the second reference plane R2 and on the third axis X3 side with respect to the fourth reference plane R4. The first gear mechanism 50 is disposed so as to be positioned as a whole on the first axis X1 side with respect to the second reference plane R2 and on the third axis X3 side with respect to the fourth reference plane R4. In such a manner, the first gear mechanism 50 is disposed as a whole in a space sectioned by the second reference plane R2, the first reference plane R1, and the fourth reference plane R4. The first gear mechanism 50 is disposed, in a major portion excluding a part of the first gear 51, in a space sectioned by the second reference plane R2, the seventh reference plane R7, and the fourth reference plane R4. In the present embodiment, the first gear mechanism 50 includes a portion overlapping with the damper D as viewed in the axial direction. On the other hand, the first gear mechanism 50 does not include a portion overlapping with the second rotary electric machine 40 as viewed in the axial direction.

In the present embodiment, the fifth axis X5 that is the rotational axis center of the second gear mechanism 60 is disposed so as to be positioned on the side opposite to the first axis X1 side with respect to the second reference plane R2. Both the fourth gear 62 and the second connecting shaft 63 constituting the second gear mechanism 60 are disposed so as to be positioned as a whole on the side opposite to the first axis X1 side with respect to the second reference plane R2. The third gear 61 constituting the second gear mechanism 60 is disposed so as to be positioned partially on the first axis X1 side with respect to the second reference plane R2. When a virtual perpendicular plane including the fourth axis X4 is defined as an eighth reference plane R8 here, the second gear mechanism 60 is disposed so as to be positioned as a whole on the side opposite to the first axis X1 side with respect to the eighth reference plane R8.

In addition, the fifth axis X5 is disposed so as to be positioned on the second axis X2 side with respect to the first reference plane R1 and on the third axis X3 side with respect to the third reference plane R3. The second gear mechanism 60 is disposed so as to be positioned as a whole on the second axis X2 side with respect to the first reference plane R1 and on the third axis X3 side with respect to the third reference plane R3. In addition, the fifth axis X5 is disposed so as to be positioned on the second axis X2 side (upper side) with respect to the fifth reference plane R5 and the third axis X3 side (lower side) with respect to the sixth reference plane R6. Both the fourth gear 62 and the second connecting shaft 63 constituting the second gear mechanism 60 are disposed so as to be positioned as a whole on the second axis X2 side (upper side) with respect to the fifth reference plane R5 and the third axis X3 side (lower side) with respect to the sixth reference plane R6. The third gear 61 constituting the second gear mechanism 60 is disposed so as to be positioned as a whole on the third axis X3 side (lower side) with respect to the sixth reference plane R6 and partially on the third axis X3 side (lower side) with respect to the fifth reference plane R5.

The second gear mechanism 60 is disposed as a whole in a space sectioned by the seventh reference plane R7, the eighth reference plane R8, and the third reference plane R3. The second gear mechanism 60 is disposed, in a major portion excluding a part of the third gear 61, in a space sectioned by the fifth reference plane R5, the second reference plane R2, and the sixth reference plane R6. The second gear mechanism 60 is disposed largely distant from the damper D as viewed in the axial direction and disposed so as not to overlap with the damper D as viewed in the axial direction. The second gear mechanism 60 is disposed largely distant also from the first gear mechanism 50 as viewed in the axial direction and disposed so as not to overlap with the first gear mechanism 50 as viewed in the axial direction.

By adapting such an arrangement configuration, the interference between the second gear mechanism 60 and the first gear mechanism 50 in the axial direction can be avoided, and the interference between the second gear mechanism 60 and the damper D in the axial direction can be avoided. Thereby, as shown in FIG. 4, it is possible to dispose the second gear mechanism 60 close to the damper D side in the axial direction. Further, it is possible to dispose the second gear mechanism 60 close to the internal combustion engine E side in the axial direction.

In addition, in the present embodiment, the second gear 52 meshed with the input gear 71 of the output device 70 is disposed on the damper D side in the axial direction with respect to the first gear 51, and the fourth gear 62 meshed with the input gear 71 is disposed on the side opposite to the damper D side in the axial direction with respect to the third gear 61. Thereby, the ring gear 23 of the differential gear device 20 and the first gear 51 meshed with the first output gear 26 that rotates together with the ring gear 23 are disposed on the side opposite to the third gear 61 meshed with the second output gear 45 of the second rotary electric machine 40 in the axial direction with respect to the input gear 71. In the present embodiment, "the first output gear 26 and the first gear 51," "the second gear 52, the input gear 71, and the fourth gear 62," and "the third gear 61 and the second output gear 45" are disposed so as to approach the internal combustion engine E side in the axial direction in the mentioned order.

In such a configuration, as clearly seen in FIG. 4, the second gear mechanism 60 can be disposed close to the internal combustion engine E side in the axial direction. In the present embodiment, the third gear 61 of the second gear mechanism 60 not overlapping with the damper D as viewed in the axial direction is disposed so as to include a portion overlapping with the damper D as viewed in the radial direction with reference to the fifth axis X5. That is, the second gear mechanism 60 is disposed adjacent to the internal combustion engine E side in the axial direction to the extent that at least a part of the second gear mechanism 60 occupies the same position in the axial direction as the damper D. Thereby, the second rotary electric machine 40 also can be disposed close to the internal combustion engine E side in the axial direction. Thus, it is possible to shorten the length of the entire device in the axial direction along the second axis X2. Alternatively, as described above, it is possible to utilize the large-sized second rotary electric machine 40 without enlarging the length of the entire device in the axial direction along the second axis X2.

Second Embodiment

Figure 5:
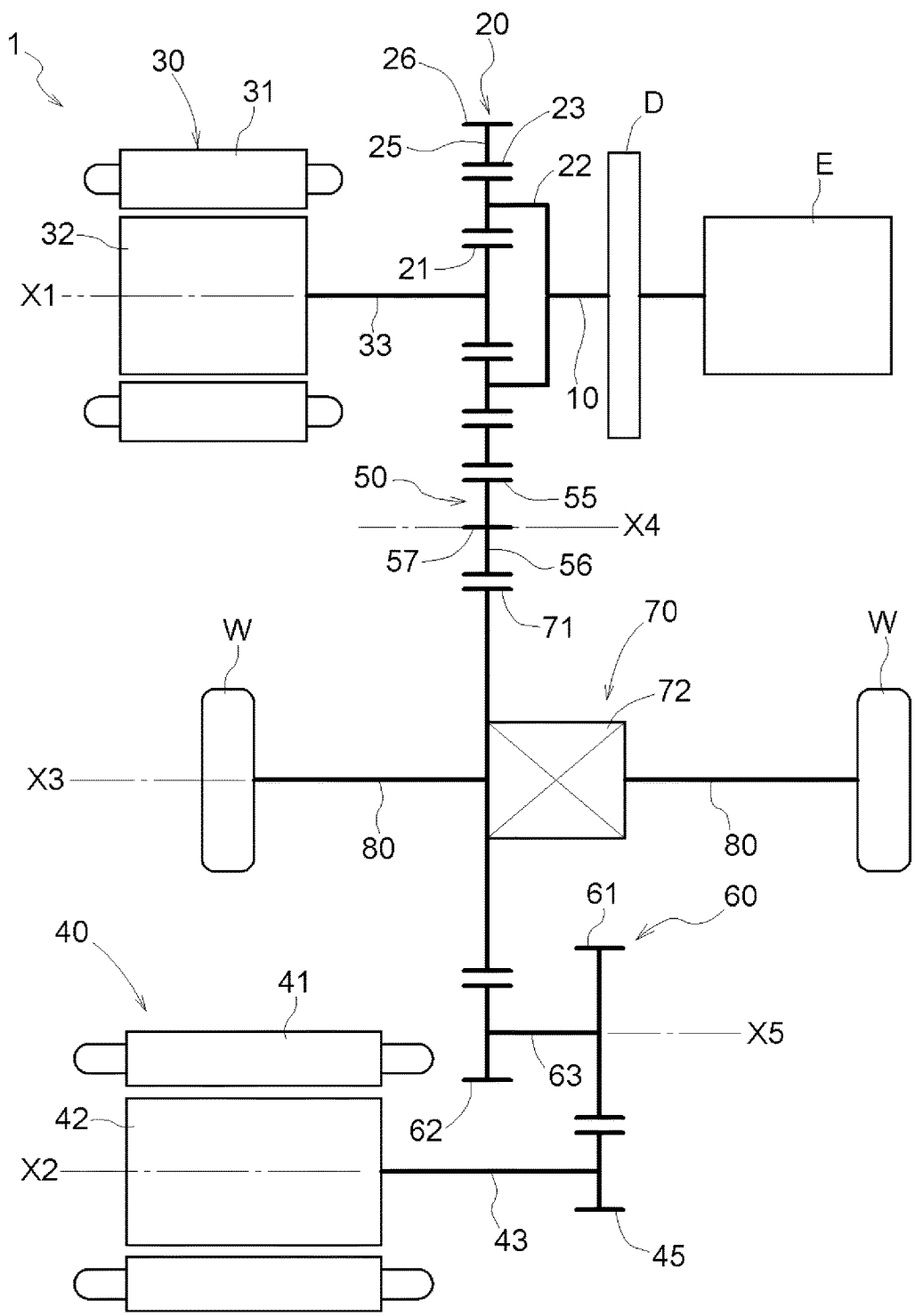
FIG. 5 is a skeleton view of a vehicular drive device according to a second embodiment.

The second embodiment of the vehicular drive device is explained with reference to drawings. As shown in FIG. 5, the vehicular drive device 1 according to the present embodiment differs from the aforementioned first embodiment in a configuration in which the first gear mechanism 50 is constituted by an idler gear 55 formed by a single gear. Hereinafter, differences from the first embodiment are mainly explained. Note that items not specifically mentioned have the same configuration as the first embodiment.

The first gear mechanism 50 includes a single discoid member 56 and a support shaft 57 that supports the discoid member 56 at a position of the rotational axis center thereof. The idler gear 55 is formed on an outer peripheral surface of the discoid member 56. The idler gear 55 is an intermediate gear that is provided between the first output gear 26 that rotates together with the ring gear 23 of the differential gear device 20 and the input gear 71 of the output device 70 so as to mesh with each other. The idler gear 55 matches the rotational direction of the first output gear 26 with the rotational direction of the input gear 71 as well as functions to fill an inter-shaft distance between the first output gear 26 and the input gear 71. The idler gear 55 is also referred to as an idle gear.

Figure 6:
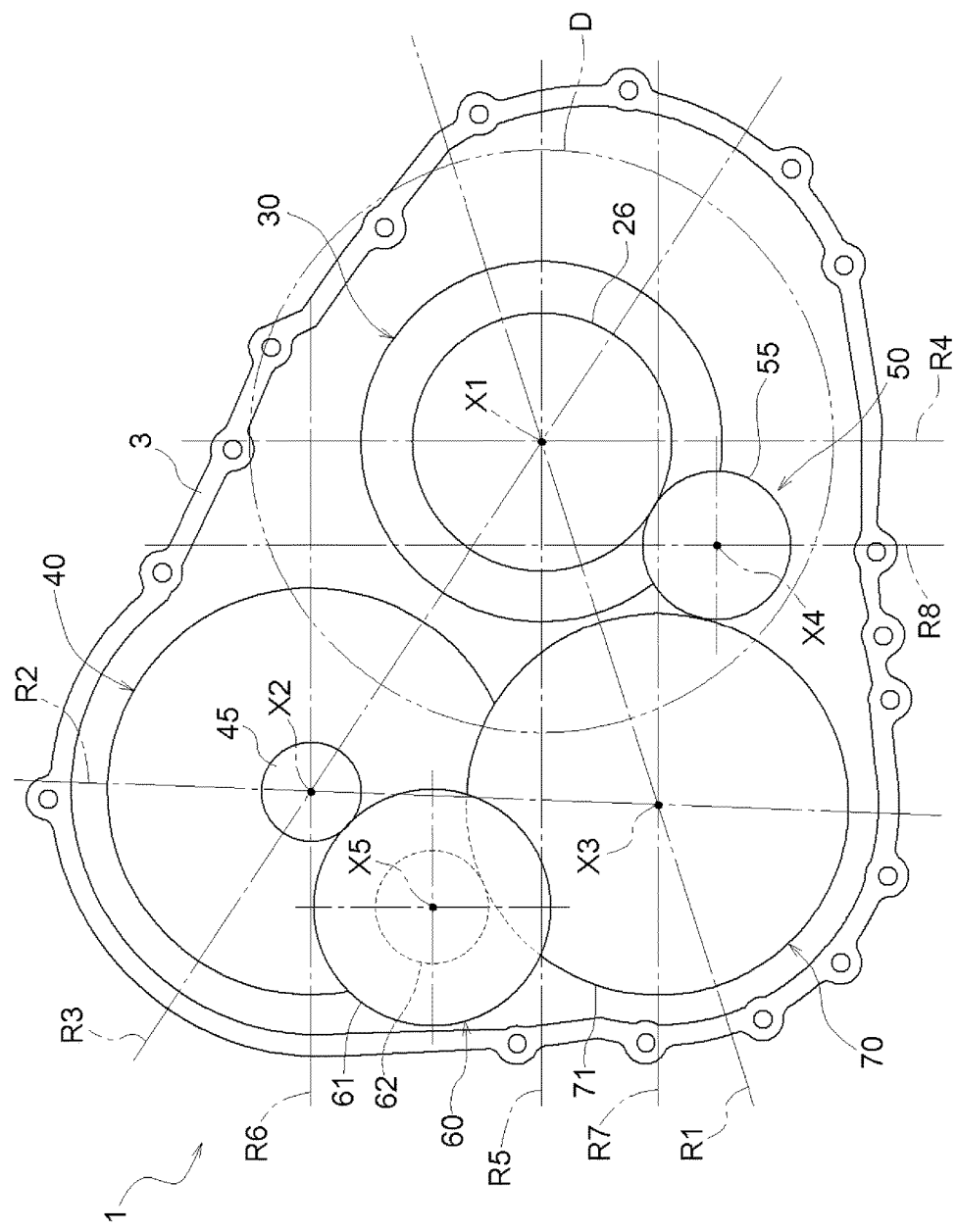
FIG. 6 is a schematic view showing an arrangement of parts as viewed in the axial direction.

As shown in FIG. 6, the fourth axis X4 that is the rotational axis center of the first gear mechanism 50 is disposed so as to be positioned on the side opposite to the second axis X2 side with respect to the first reference plane R1. The first gear mechanism 50 is disposed so as to be positioned as a whole on the side opposite to the second axis X2 side with respect to the first reference plane R1. In addition, the fourth axis X4 is disposed so as to be positioned on the side (lower side) opposite to the second axis X2 side with respect to the seventh reference plane R7. The idler gear 55 constituting the first gear mechanism 50 is disposed so as to be positioned partially on the second axis X2 side (upper side) with respect to the seventh reference plane R7.

In addition, the fourth axis X4 is disposed so as to be positioned on the first axis X1 side with respect to the second reference plane R2 and on the third axis X3 side with respect to the fourth reference plane R4. The idler gear 55 constituting the first gear mechanism 50 is disposed so as to be positioned as a whole on the first axis X1 side with respect to the second reference plane R2 and the third axis X3 side with respect to the fourth reference plane R4. In such a manner, the idler gear 55 constituting the first gear mechanism 50 is disposed as a whole in a space sectioned by the second reference plane R2, the first reference plane R1, and the fourth reference plane R4.

Figure 7:
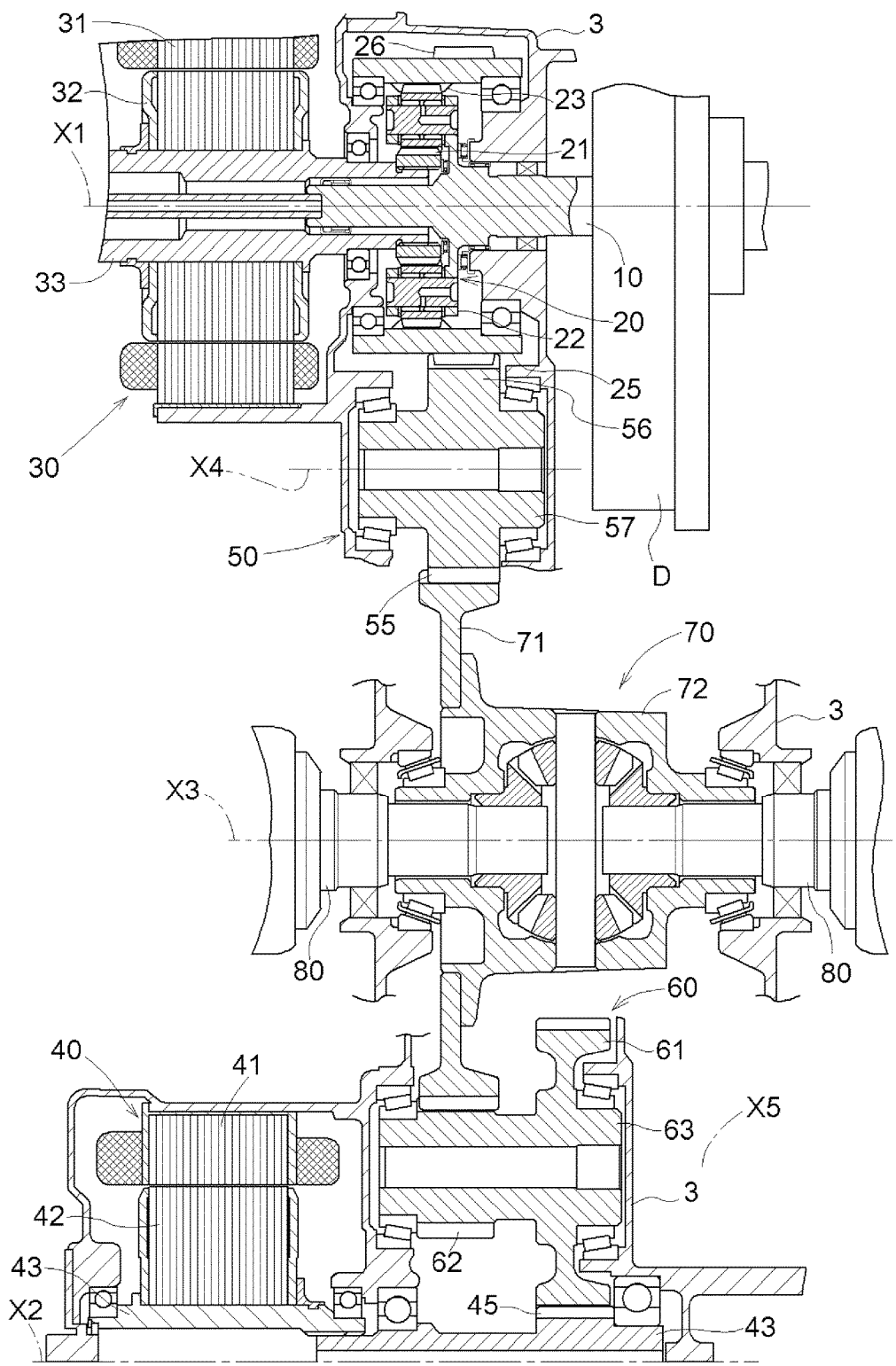
FIG. 7 is a partial sectional view of the vehicular drive device.

As shown in FIG. 7, in the present embodiment, the first output gear 26 is formed on a portion on the internal combustion engine E side with respect to the center in the axial direction of the differential output member 25. In addition, in the present embodiment, the first output gear 26, the idler gear 55, the input gear 71, and the fourth gear 62 are disposed at the same position in the axial direction. On the internal combustion engine E side in the axial direction with respect to these members, the third gear 61 and the second output gear 45 are disposed. Even in such an arrangement, as clearly seen in FIG. 7, the second gear mechanism 60 can be disposed close to the internal combustion engine E side in the axial direction. Thus, it is possible to shorten the length of the entire device in the axial direction along the second axis X2. Alternatively, it is possible to utilize the large-sized second rotary electric machine 40 without enlarging the length of the entire device in the axial direction along the second axis X2.

Other Embodiments

Lastly, vehicular drive devices according to other embodiments are explained. Each of the configurations disclosed in the following embodiments may be combined with those disclosed in other embodiments as far as no contradiction arises.

(1) In the aforementioned first embodiment, a configuration is explained as an example, in which the second gear 52 of the first gear mechanism 50 is disposed on the internal combustion engine E side in the axial direction with respect to the first gear 51. However, embodiments of the present disclosure are not limited thereto. For example, the second gear 52 may be disposed on the side opposite to the internal combustion engine E side in the axial direction with respect to the first gear 51.

(2) In the aforementioned respective embodiments, a configuration is explained as an example, in which the third gear 61 of the second gear mechanism 60 is disposed on the side (internal combustion engine E side) opposite to the second rotary electric machine 40 side in the axial direction with respect to the fourth gear 62. However, embodiments of the present disclosure are not limited thereto. For example, the third gear 61 may be disposed on the second rotary electric machine 40 side (side opposite to the internal combustion engine E side) in the axial direction with respect to the fourth gear 62.

(3) In the aforementioned respective embodiments, a configuration is explained as an example, in which the third gear 61 of the second gear mechanism 60 is disposed so as to overlap with the damper D as viewed in the radial direction. However, embodiments of the present disclosure are not limited thereto. For example, the third gear 61 may be disposed on the differential gear device 20 side with respect to the damper D in the axial direction so as not to overlap with the damper D as viewed in the radial direction.

(4) In the aforementioned respective embodiments, a configuration is explained as an example, in which the second gear mechanism 60 is a counter deceleration mechanism provided with the third gear 61 and the fourth gear 62. However, embodiments of the present disclosure are not limited thereto. For example, the second gear mechanism 60 may be configured as a same speed transmission mechanism including an idler gear formed by a single gear.

(5) In the aforementioned respective embodiments, a configuration is explained as an example, in which the main body 72 of the output device 70 is disposed on the internal combustion engine E side in the axial direction with respect to the input gear 71. However, embodiments of the present disclosure are not limited thereto. For example, the main body 72 may be disposed on the side (the first rotary electric machine 30 and the second rotary electric machine 40) opposite to the internal combustion engine E side in the axial direction with respect to the input gear 71.

(6) In the aforementioned respective embodiments, a configuration is explained as an example, in which the second axis X2 and the third axis X3 that are disposed on one side in the horizontal direction with respect to the first axis X1 are disposed at a nearly equal position in the horizontal direction as viewed in the axial direction. However, embodiments of the present disclosure are not limited thereto. The arrangement relationship of the three axes (the first axis X1, the second axis X2, and the third axis X3) may be set in any manner. For example, in the aforementioned respective embodiments, the third axis X3 may be disposed on the side opposite to the first axis X1 side with respect to the second axis X2. It is only necessary that the first gear mechanism 50 and the second gear mechanism 60 are disposed such that the positional relationship with the respective reference planes R1 to R3 meets a predetermined condition in accordance with the arrangement relationship of the three axes.

Figure 8:
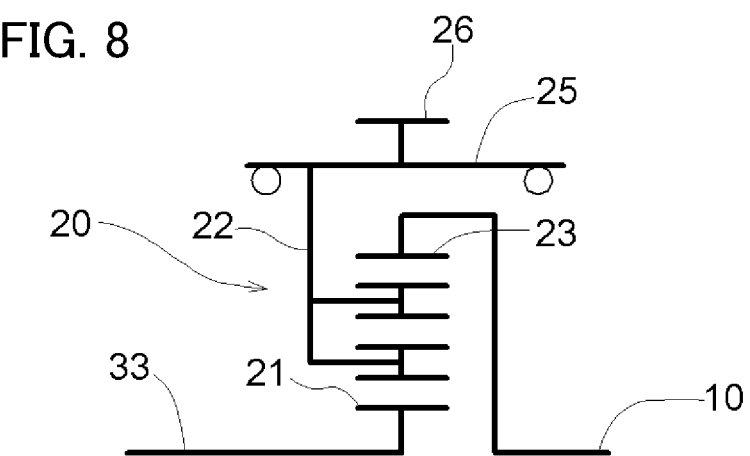
FIG. 8 is a skeleton view showing another mode of the differential gear device.
Figure 9:
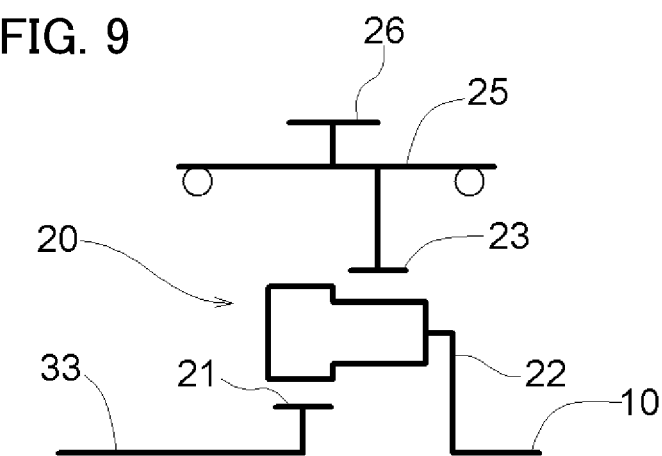
FIG. 9 is a skeleton view showing another mode of the differential gear device.

(7) In the aforementioned respective embodiments, a configuration is explained as an example, in which the differential gear device 20 is configured by a single pinion planetary gear mechanism. However, embodiments of the present disclosure are not limited thereto. The differential gear device 20 may employ a known specific configuration. For example, as shown in FIG. 8, the differential gear device 20 may be configured by a double pinion planetary mechanism. In such a configuration, the three rotational elements of the differential gear device 20 become, in an order of rotational speed, the sun gear 21, the ring gear 23, and the carrier 22 (velocity diagram not shown). The first rotary electric machine 30 is drivingly coupled to the sun gear 21 of the differential gear device 20, the input shaft 10 is drivingly coupled to the ring gear 23, and the output device 70 is drivingly coupled to the first output gear 26 that rotates together with the carrier 22. Alternatively, as shown in FIG. 9, the differential gear device 20 may be configured by a planetary gear mechanism including a stepped pinion.

(8) With regard to other configurations, embodiments disclosed herein are merely examples in all respects, and it should be understood that the present disclosure is not limited to these embodiments. Those skilled in the art will easily understand that appropriate modifications can be made without departing from the gist of the present disclosure. Accordingly, the scope of the present disclosure naturally includes also other embodiments that are modified without departing from the gist of the present disclosure.

INDUSTRIAL APPLICABILITY

The present disclosure may be applied to a drive device for a hybrid vehicle.

The invention claimed is:

1. A vehicular drive device comprising:
an input member drivingly coupled to an internal combustion engine through a damper;
a first rotary electric machine;
a second rotary electric machine;
a differential gear device including three rotational elements;
an output device drivingly coupled to a wheel, in which, among the three rotational elements of the differential gear device, one rotational element is drivingly coupled to the input member, another rotational element is drivingly coupled to the first rotary electric machine, an output element as a resting rotational element is drivingly coupled to the output device, and the second rotary electric machine is drivingly coupled to the output device;
a first gear mechanism that transmits a driving force between the output element and the output device; and
a second gear mechanism that transmits a driving force between the second rotary electric machine and the output device, wherein
the damper, the differential gear device, and the first rotary electric machine are disposed side by side on a first axis that is common thereto,
the second rotary electric machine is disposed on a second axis that is parallel to the first axis and is different from the first axis,
the output device is disposed on a third axis that is parallel to the first axis and is different from the first axis and the second axis,
the first gear mechanism is disposed on a fourth axis that is positioned on a side opposite to the second axis side with respect to a first reference plane that is a plane including both the first axis and the third axis, and
the second gear mechanism is disposed on a fifth axis that is positioned on a side opposite to the first axis side with respect to a second reference plane that is a plane including both the second axis and the third axis.

2. The vehicular drive device according to claim 1, wherein the second gear mechanism is disposed so as not to overlap with the damper as viewed in an axial direction.

3. The vehicular drive device according to claim 2, wherein
the second gear mechanism includes a first gear that is meshed with a first output gear of the second rotary electric machine and a second gear that is meshed with an input gear of the output device at a position different from the first gear in an axial direction, and
the first gear is disposed on a side opposite to the second rotary electric machine side in the axial direction with respect to the second gear.

4. The vehicular drive device according to claim 3, wherein the first gear is disposed so as not to overlap with the damper as viewed in the axial direction and so as to overlap with the damper as viewed in a radial direction.

5. The vehicular drive device according to claim 4, wherein
the first gear mechanism includes a third gear that is meshed with a second output gear rotating together with the output element and a fourth gear that is meshed with an input gear of the output device at a position different from the third gear in an axial direction, and
the fourth gear is disposed on the damper side in the axial direction with respect the third gear.

6. The vehicular drive device according to claim 5, wherein
in a vehicle mounted state, the second axis and the third axis are disposed on one side in a horizontal direction with respect to the first axis, and
the second axis is disposed on an upper side with respect to the third axis.

7. The vehicular drive device according to claim 1, wherein
the second gear mechanism includes a first gear that is meshed with a first output gear of the second rotary electric machine and a second gear that is meshed with an input gear of the output device at a position different from the first gear in an axial direction, and
the first gear is disposed on a side opposite to the second rotary electric machine side in the axial direction with respect to the second gear.

8. The vehicular drive device according to claim 7, wherein the first gear is disposed so as not to overlap with the damper as viewed in the axial direction and so as to overlap with the damper as viewed in a radial direction.

9. The vehicular drive device according to claim 1, wherein
the first gear mechanism includes a first gear that is meshed with a first output gear rotating together with the output element and a second gear that is meshed with an input gear of the output device at a position different from the first gear in an axial direction, and
the second gear is disposed on the damper side in the axial direction with respect the first gear.

10. The vehicular drive device according to claim 2, wherein
the first gear mechanism includes a first gear that is meshed with a first output gear rotating together with the output element and a second gear that is meshed with an input gear of the output device at a position different from the first gear in an axial direction, and
the second gear is disposed on the damper side in the axial direction with respect the first gear.

11. The vehicular drive device according to claim 7, wherein
the first gear mechanism includes a third gear that is meshed with a second output gear rotating together with the output element and a fourth gear that is meshed with an input gear of the output device at a position different from the third gear in an axial direction, and
the fourth gear is disposed on the damper side in the axial direction with respect the third gear.

12. The vehicular drive device according to claim 3, wherein
the first gear mechanism includes a third gear that is meshed with a second output gear rotating together with the output element and a fourth gear that is meshed with an input gear of the output device at a position different from the third gear in an axial direction, and
the fourth gear is disposed on the damper side in the axial direction with respect the third gear.

13. The vehicular drive device according to claim 8, wherein
the first gear mechanism includes a third gear that is meshed with a second output gear rotating together with the output element and a fourth gear that is meshed with an input gear of the output device at a position different from the third gear in an axial direction, and
the fourth gear is disposed on the damper side in the axial direction with respect the third gear.

14. The vehicular drive device according to claim 1, wherein
    in a vehicle mounted state, the second axis and the third axis are disposed on one side in a horizontal direction with respect to the first axis, and
    the second axis is disposed on an upper side with respect to the third axis.

15. The vehicular drive device according to claim 2, wherein
    in a vehicle mounted state, the second axis and the third axis are disposed on one side in a horizontal direction with respect to the first axis, and
    the second axis is disposed on an upper side with respect to the third axis.

16. The vehicular drive device according to claim 7, wherein
    in a vehicle mounted state, the second axis and the third axis are disposed on one side in a horizontal direction with respect to the first axis, and
    the second axis is disposed on an upper side with respect to the third axis.

17. The vehicular drive device according to claim 10, wherein
    in a vehicle mounted state, the second axis and the third axis are disposed on one side in a horizontal direction with respect to the first axis, and
    the second axis is disposed on an upper side with respect to the third axis.

18. The vehicular drive device according to claim 8, wherein
    in a vehicle mounted state, the second axis and the third axis are disposed on one side in a horizontal direction with respect to the first axis, and
    the second axis is disposed on an upper side with respect to the third axis.

19. The vehicular drive device according to claim 9, wherein
    in a vehicle mounted state, the second axis and the third axis are disposed on one side in a horizontal direction with respect to the first axis, and
    the second axis is disposed on an upper side with respect to the third axis.

20. The vehicular drive device according to claim 3, wherein
    in a vehicle mounted state, the second axis and the third axis are disposed on one side in a horizontal direction with respect to the first axis, and
    the second axis is disposed on an upper side with respect to the third axis.

\* \* \* \* \*